US010705269B2

United States Patent
Rothenberg

(10) Patent No.: US 10,705,269 B2
(45) Date of Patent: Jul. 7, 2020

(54) FABRICATION METHOD OF A DIFFRACTIVE OPTIC FOR HYBRID COHERENT AND SPECTRAL BEAM COMBINATION

(71) Applicant: NORTHROP GRUMMAN SYSTEMS CORPORATION, Falls Church, VA (US)

(72) Inventor: Joshua E. Rothenberg, Los Angeles, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 193 days.

(21) Appl. No.: 15/942,173

(22) Filed: Mar. 30, 2018

(65) Prior Publication Data

US 2019/0302693 A1    Oct. 3, 2019

(51) Int. Cl.
*G02B 5/18* (2006.01)
*G02B 27/10* (2006.01)
*H01S 3/23* (2006.01)

(52) U.S. Cl.
CPC .......... *G02B 5/1861* (2013.01); *G02B 5/1814* (2013.01); *G02B 5/1823* (2013.01); *G02B 27/1006* (2013.01); *H01S 3/2391* (2013.01)

(58) Field of Classification Search
CPC ...... G02B 5/1814; G02B 5/18; G02B 5/1823; G02B 5/1861; G02B 27/1006; G02B 27/1086; G02B 27/1073
See application file for complete search history.

(56) References Cited

U.S. PATENT DOCUMENTS

| 5,601,731 | A | 2/1997 | Hillmer |
| 5,907,436 | A | 5/1999 | Perry et al. |
| 6,192,062 | B1 | 2/2001 | Sanchez-Rubio et al. |
| 6,208,679 | B1 | 3/2001 | Sanchez-Rubio et al. |
| 6,327,292 | B1 | 12/2001 | Sanchez-Rubio et al. |

(Continued)

OTHER PUBLICATIONS

PCT International Search Report of the International Searching Authority dated Jun. 27, 2019 and dated Jul. 22, 2019 for International Application No. PCT/US2019/019394 filed Feb. 25, 2019.

(Continued)

*Primary Examiner* — Wen Huang
(74) *Attorney, Agent, or Firm* — Shumaker, Loop & Kendrick, LLP; John A. Miller

(57) ABSTRACT

An integrated optical device that combines a diffractive optical element (DOE) to provide beam combining for coherent beams and a spectral beam combination (SBC) grating to provide beam combining for incoherent beams. The device includes a planar substrate and a reflective coating deposited on the substrate. A top dielectric layer is deposited on the reflective coating and a photoresist layer is deposited on the top dielectric layer. A periodic structure is formed into the top dielectric layer in a first direction that defines the DOE and a periodic grating having grooves is formed into the top dielectric layer in a second direction substantially orthogonal to the first direction that defines the SBC grating where the periodic structure includes periodic modulations along the length of the grooves that are orthogonal to a channel-to-channel periodicity of the periodic grating.

20 Claims, 5 Drawing Sheets

(56) References Cited

U.S. PATENT DOCUMENTS

| | | | |
|---|---|---|---|
| 6,697,192 | B1 | 2/2004 | Fan et al. |
| 6,708,003 | B1 | 3/2004 | Wickham et al. |
| 7,436,588 | B2 | 10/2008 | Rothenberg et al. |
| 7,440,174 | B2 | 10/2008 | Rice et al. |
| 7,821,900 | B2 | 10/2010 | Rothenberg |
| 9,417,366 | B2 | 8/2016 | Rothemberg |
| 2011/0216255 | A1* | 9/2011 | Miyauchi ............ G02F 1/133 349/19 |
| 2015/0036218 | A1* | 2/2015 | Rothenberg ......... G02B 5/18 359/576 |

OTHER PUBLICATIONS

Vorontsov, M. A. Sivokon, V. P.; "Stochastic Parallel-Gradient-Descent Technique for High-Resolution Wave-Front Phase-Distortion Correction"; J. Opt. Soc. Am. A; Oct. 1998; pp. 2745-2758; vol. 15, No. 10.

Perry, M. D., Boyd, R. D., Britten, J. A., Decker, D., Shore, B. W.; "High-Efficiency Multilayer Dielectric Diffraction Gratings"; Optics Letters; Apr. 15, 1998; pp. 940-942; vol. 20, No. 8.

Leger, James R., Swanson, Gary J., Veldkamp, Wilfrid B.; "Coherent Laser Addition Using Binary Phase Gratings"; Applied Optics; Oct. 15, 1987; pp. 4391-4399; vol. 26, No. 20.

Augst, S. J., Goyal, A. K., Aggarwal, R. L., Fan, T. Y., Sanchez, A.; Wavelength Beam Combining of Ytterbium Fiber Lasers; Optics Letters; Mar. 1, 2003; pp. 331-333; vol. 28, No. 5.

Hergenhan, Guido, Lucke, Bernd, Brauch, Uwe; "Coherent Coupling of Vertical-Cavity Surface-Emitting Laser Arrays and Efficient Beam Combining by Diffractive Optical Elements: Concept and Experimental Verification"; Applied Optics; Mar. 20, 2003; pp. 1667-1680; vol. 42, No. 9.

Schattenburg, M. L., Chen, C. G., Heilmann, R. K., Konkola, P. T., Pati, G. S.; "Progress Towards a General Grating Patterning Technology Using Phase-Locked Scanning Beams."; Optical Spectroscopic Techniques,Remote Sensing, and Instrumentation for Atmospheric and Space Research IV, Allen M. Larar, Martin G. Mlynczak, Editors, Proceedings of SPIE; 2002; pp. 378-384; vol. 4485.

Pati, G. S., Heilmann, R. K., Konkola, P. T., Joo, C., Chen, C. G., Murphy, E., Schattenburg, M. L.; "Generalized Scanning Beam Interference Lithography System for Patterning Gratings with Variable Period Progressions"; J. Vac. Sci. Technol. B; Nov./Dec. 2002; pp. 2617-2621; vol. 20, No. 6.

Britten, J. A., Perry, M. D., Shore, B. W., Boyd, R.D., Loomis, G. E., Chow, R.; "High-Efficiency, Dielectric Multilayer Gratings Optimized for Manufacturability and Laser Damage Threshold"; SPIE; pp. 511-520; vol. 2714.

Shay, T. M., Benham, Vincent; "First Experimental Demonstration of Phase Locking of Optical Fiber Arrays by RF Phase Modulation"; Free-Space Laser Communications IV, edited by Jennifer C. Ricklin, David G. Voelz, Proceedings of SPIE; 2004; pp. 313-319; vol. 5550.

Fan, T. Y., Sanchez, A.; "Coherent (Phased Array) and Wavelength (Spectral) Beam Combining Compared"; Fiber Lasers II: Technology, Systems, and Applications, edited by L. N. Durvasula, Andrew J. W. Brown, Johan Nilsson, Proceedings of SPIE; 2005; pp. 157-164; vol. 5709.

* cited by examiner

FABRICATION METHOD OF A DIFFRACTIVE OPTIC FOR HYBRID COHERENT AND SPECTRAL BEAM COMBINATION

BACKGROUND

Field

This disclosure relates generally to an optical device including a integrated diffractive optical element (DOE) and spectral beam combination (SBC) grating and, more particularly, to an integrated optical element having a DOE and an SBC grating that provides both beam combining for coherent beams and spectral beam combining for incoherent beams, where the DOE and the SBC grating are fabricated in a top layer of the element in a single fabrication step.

Discussion

High power laser amplifiers have many applications, including industrial, commercial, military, etc. Designers of laser amplifiers are continuously investigating ways to increase the power of the laser amplifier for these applications. One known type of laser amplifier is a fiber laser amplifier that employs a doped fiber and a pump beam to generate the laser beam, where the fiber has an active core diameter of about 10-20 µm or larger.

Improvements in fiber laser amplifier designs have increased the output power of the fiber to approach its theoretical power and beam quality limit. To further increase the output power of a fiber amplifier some fiber laser systems employ multiple fiber lasers that amplify and combine the seed beams in some fashion to generate higher powers. A design challenge for fiber laser amplifier systems of this type is to combine the beams from a plurality of fibers in a coherent manner so that the beams provide a single beam output having a uniform phase over the beam diameter such that the beam can be focused to a small focal spot. Focusing the combined beam to a small spot at a long distance (far-field) defines the beam quality of the beam, where the more coherent the individual seed beams the more uniform the combined phase and the better the beam quality.

In one known multiple fiber amplifier design, a master oscillator (MO) generates a seed beam that is split into a plurality of split seed beams each having a common wavelength where each seed beam is amplified. The amplified beams are then collimated and directed to a diffractive optical element (DOE) that combines the coherent amplified beams into a single output beam. The DOE has a periodic structure formed into the element so that when the individual amplified beams each having a slightly different angular direction are redirected by the periodic structure all of the beams diffract from the DOE in the same direction. Each seed beam is provided to a phase modulator that controls the phase of the beam so that the phase of all the seed beams is maintained coherent. However, limitations on bandwidth and phasing errors limits the number of amplified beams that can be coherently combined, thus limiting the output power of the laser.

To overcome these limitations and further increase the laser power, multiple master oscillators are provided to generate seed beams at different wavelengths, where each of the individual wavelength seed beams are split into a number of split seed beams and where each group of seed beams has the same wavelength and are mutually coherent. Each group of the coherent seed beams at a respective wavelength are first coherently combined by a DOE, and then each group of coherently combined beams are directed to a spectral beam combination (SBC) grating at slightly different angles that diffracts the beams in the same direction as a single combined beam of multiple wavelengths. The SBC grating also includes a periodic structure for combining the beams at the different wavelengths.

A hybrid fiber laser amplifier system of this type can be found in U.S. Pat. No. 7,436,588 issued Oct. 14, 2008 to Rothenberg et al., titled, Method and System for Hybrid Coherent and Incoherent Diffractive Beam Combining, assigned to the assignee of this application and herein incorporated by reference. The '588 patent discloses various embodiments for a hybrid fiber laser amplifier system, where each embodiment includes a DOE for providing coherent beam combining and an SBC grating for providing spectral beam combining, as discussed above. In one particular embodiment, the '588 patent combines the DOE and SBC grating into a single optical element, where the periodic structure for the DOE and the SBC grating are orthogonal to each other.

U.S. Pat. No. 9,417,366 issued Aug. 16, 2016 to Rothenberg, titled, Hybrid Diffractive Optical Element and Spectral Beam Combination Grating, assigned to the assignee of this application and herein incorporated by reference, discloses an optical device that includes an integrated DOE and SBC grating that is suitable to be employed in the fiber laser amplifier system disclosed in the '588 patent. The optical device is fabricated by forming a periodic pattern into a top surface of an optically flat substrate in one direction that defines a periodic structure for the DOE. A multi-layer dielectric high-reflection (HR) coating is deposited on the substrate so that it conforms to the periodic pattern and is accurately reproduced therein. A top dielectric layer is deposited on the HR coating that also conforms to the periodic pattern and that is etched to form periodic grooves for the SBC grating in a second direction orthogonal to the first direction. Although the optical device of the '366 patent has been shown to be effective as a combined DOE and SBC grating, improvements in optical performance and fabrication complexity can be realized. For example, the fabrication process of the '366 optical device requires separate fabrication steps for the DOE and the SBC grating.

DETAILED DESCRIPTION OF THE EMBODIMENTS

The following discussion of the embodiments of the disclosure directed to an optical device including an integrated DOE and SBC grating is merely exemplary in nature, and is in no way intended to limit the disclosure or its applications or uses.

Figure 1:
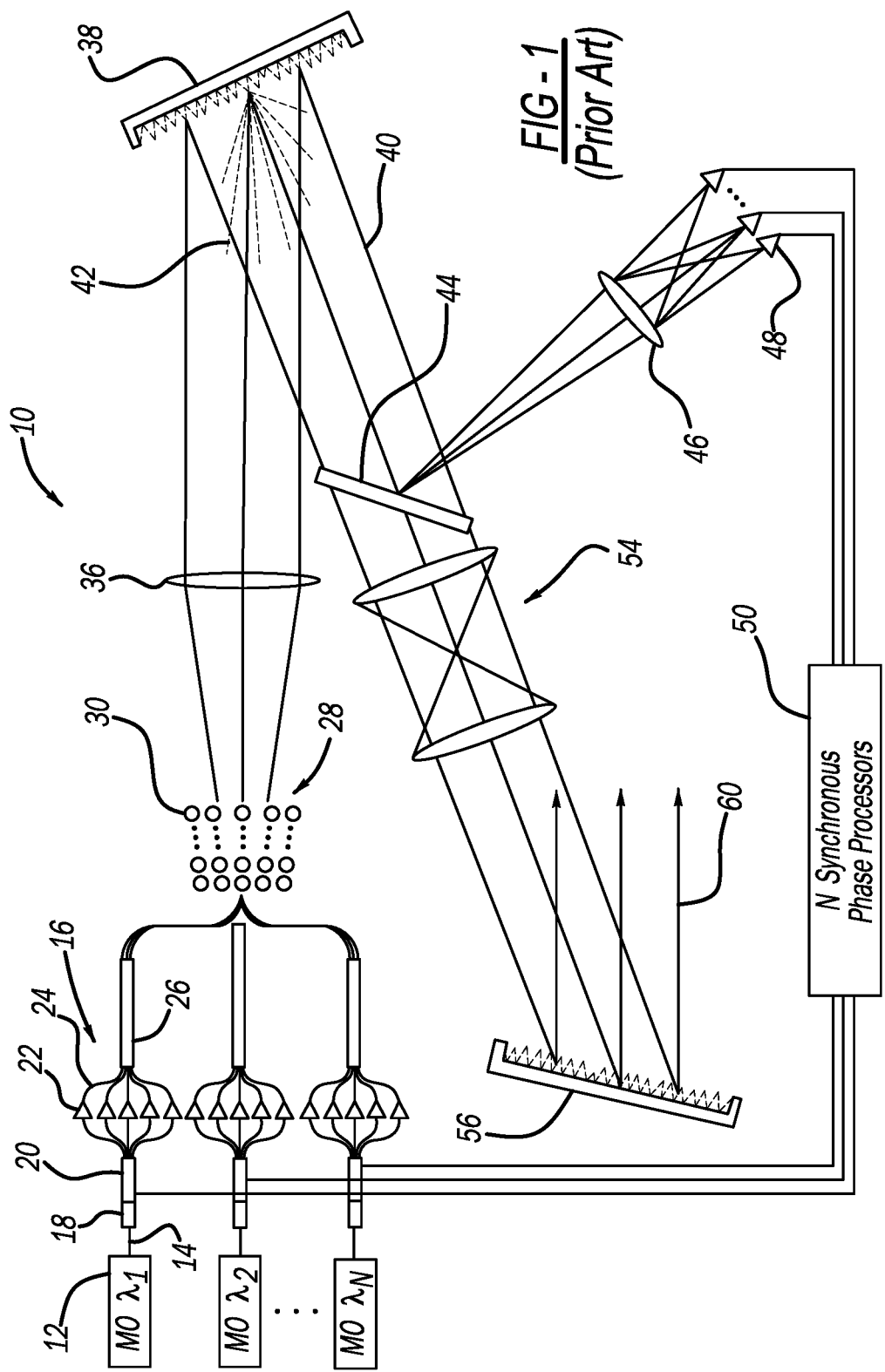
FIG. 1 is a schematic plan view of a known fiber laser amplifier including a separate DOE and SBC grating.

FIG. 1 is a schematic diagram of a known fiber laser amplifier system 10 including a plurality of N master oscillators (MO) 12 each generating a seed beam of an appropriate line-width on an optical fiber 14 for separate beam channels or wavelength groups 16 having a slightly different wavelength $\lambda_1, \lambda_2, \ldots, \lambda_N$. The MO 12 may also incorporate a phase modulator to broaden its line-width to suppress nonlinearities in subsequent amplification. The seed beam on each of the fibers 14 is sent to a beam splitter 18 that splits the seed beam into a plurality of M split seed beams where each split beam is provided to a separate phase modulator 20. The splitter 18 and the plurality of phase modulators 20 in each wavelength group 16 are separate devices, but are shown here as a single device because they can be implemented on a single chip. The phase modulators 20 correct the phase of each split seed beams so that all of the beams are coherent and in phase with each other as will be discussed below. In this non-limiting embodiment, each wavelength group 16 includes five seed beams, however, the number of seed beams in each wavelength group 16 can be any number suitable for a particular application, and will be represented herein as M seed beams. The M split seed beams from the phase modulators 20 are each sent to a fiber amplifier 22, where the amplifiers 22 represent the doped amplifying portion of a fiber 24 that receives an optical pump beam (not shown).

Each wavelength group 16 of M fibers 24 are combined into a one-dimensional array of seed beams by a suitable optical device 26 so that all of the amplified beams from all of the fibers 24 are combined to define a two-dimensional fiber array 28 of amplified beams 30, where each column of the beams 30 in the array 28 are the beams from the fibers 24 within one of the wavelength groups 16 and have the same wavelength $\lambda_i$, where i=1, 2, 3, . . . , N for each of the columns. It will be understood that the array 28 has been rotated 90° from the propagation path of the beams 30 so that the orientation of the beams 30 can be visualized. It is noted that the configuration of the beams 30 in the array 28 is shown in an orientation where the spacing between the beams 30 of the longer wavelength is greater. Particularly, the wavelength $\lambda_1$ of the beams 30 in the left most column are closer together because the wavelength $\lambda_1$ is for exemplary purposes assumed to be the shortest and the wavelength $\lambda_N$ of the beams 30 in the right most column of the array 28 are spaced farther apart because the wavelength $\lambda_N$ is assumed the longest.

The M×N amplified beams 30 from the array 28 are collimated by collimating optics 36, where the beams 30 have slightly different angles of propagation as a result of their position in the array 28. The collimated amplified beams 30 are directed to a DOE 38 that is positioned in the back focal plane of the collimating optics 36 to ensure an optimal overlap of all of the beams 30 on the DOE 38 at the same location. The DOE 38 is an optical element having a periodic structure that directs the beams 30 in respective columns that are coherent into respective single beams for each of N columns in array 28 so that N number of coherently combined beams 40, each at respective wavelengths $\lambda_i$, where i=1, 2, 3, . . . , N, propagating in slightly different directions are reflected from the DOE 38. The DOE 38 will also diffract a number of spurious order beams 42 as a result of DOE inefficiencies. Proper phasing results in an efficient combination of M beams from each group 16 at wavelength $\lambda_i$.

The N combined beams 40 diffracted by the DOE 38 are sampled by a splitter 44 so that N sample beams of low power, one for each wavelength $\lambda_i$, are generated, where each sample beam has a slightly different angular displacement. A lens 46 focuses the N sample beams to spatially separated phase detectors 48, such as photodetectors, where each detector 48 detects the phase of the M constituent beams at one of N specific wavelengths, which have been combined by the DOE 38. The phase detectors 48 measure the phase of the combined beam at the particular wavelength $\lambda_i$ and provide an electrical measurement signal to a synchronous phase processor 50, where a separate processor 50 is provided for each of the detectors 48.

The phase of the constituent beams in each N combined beam can be distinguished in a single output from the phase detector 48 by uniquely dithering or coding the constituent beams in phase or amplitude, such as by using distinct frequencies for frequency modulation (FM) or amplitude modulation (AM), distinct codes for code division multiple access (CDMA) or time division multiple access (TDMA), etc., so that a synchronous detector scheme can distinguish the constituent phase signals for each seed beam in the combined beam. Such a technique is disclosed, for example, in U.S. Pat. No. 7,346,085 issued Mar. 18, 2008 to Rothenberg et al., titled, Multi-Stage Method and System for Coherent Diffractive Beam Combining, assigned to the assignee of this application and herein incorporated by reference. Each synchronous phase processor 50 decodes the distinct constituent phases in the measurement signal from the phase detector 48, and generates phase error correction signals for each seed beam that are sent to the corresponding phase modulator 20 so that adjustments to the phase of the individual seed beams in the fiber amplifiers 22 causes all of the constituent seed beams to be locked in phase. Because the array of amplified beams fully overlap and are combined into a single beam, no gaps are present between beams on the DOE and side lobes owning to reduced fill factor are eliminated, and the output beam can be focused to a nearly diffraction limited spot to nearly reach the theoretical limit of brightness provided by the total combined power of the beams.

The N angularly displaced combined beams 40 that pass through the beam sampler 44 are relayed by relay optics 54 and are imaged onto an SBC grating 56 to provide spectral beam combination of all of the N combined beams 40 of varied wavelengths while preserving the required angles of incidence. The wavelength $\lambda_i$ of each of the N combined beams 40 is selected in accordance with the angular dispersion of the SBC grating 56 to precisely compensate for angular deviation. The SBC grating 56 includes a periodic grating structure to diffract the N combined beams 40 having different angles into a common direction. Thus, a single diffraction limited output beam 60 is provided at the output of the fiber amplifier system 10 that combines all of the M×N beams with high efficiency and with low power in the spurious diffracted orders.

It is noted that although the DOE 38 and the SBC grating 56 are shown as reflective structures that reflect the optical beams that impinge thereon, other fiber laser amplifier system designs may employ transmissive elements where the optical beams that impinge the DOE or SBC grating propagate through the optical element.

Figure 2:
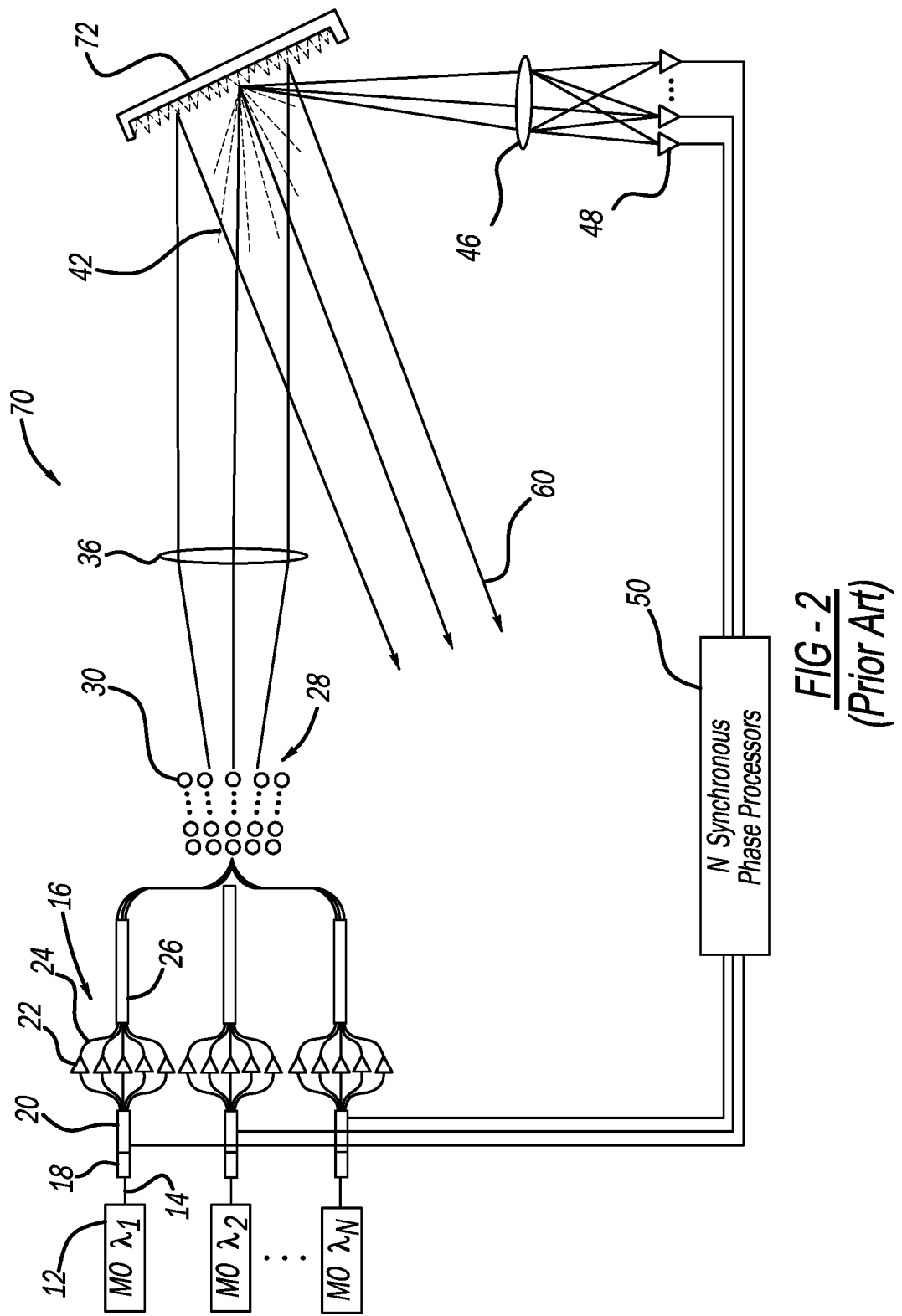
FIG. 2 is a schematic plan view of a known fiber laser amplifier including an integrated DOE and SBC grating.

FIG. 2 is a schematic diagram of a known fiber laser amplifier system 70 similar to the fiber laser amplifier 10, where like elements are identified by the same reference numeral. The amplifier system 70 includes an integrated DOE and SBC grating optical element 72 instead of the separate DOE 38 and the SBC grating 56 discussed above that provides a single optical element that combines both the coherent beams and the beams of differing wavelengths.

This provides the advantage of fewer optical elements and a more compact size for the amplifier system. The low power sample beam directed towards the lens 46 is the $0^{th}$ order reflection from the SBC grating in the optical element 72. The $1^{st}$ or higher order diffracted beams from the SBC grating is part of the output beam 60. In order to fabricate the optical element 72, a DOE design is implemented for a combination of a specific number of M beams, and thus a phase function $\varphi(x)$.

Figure 3:
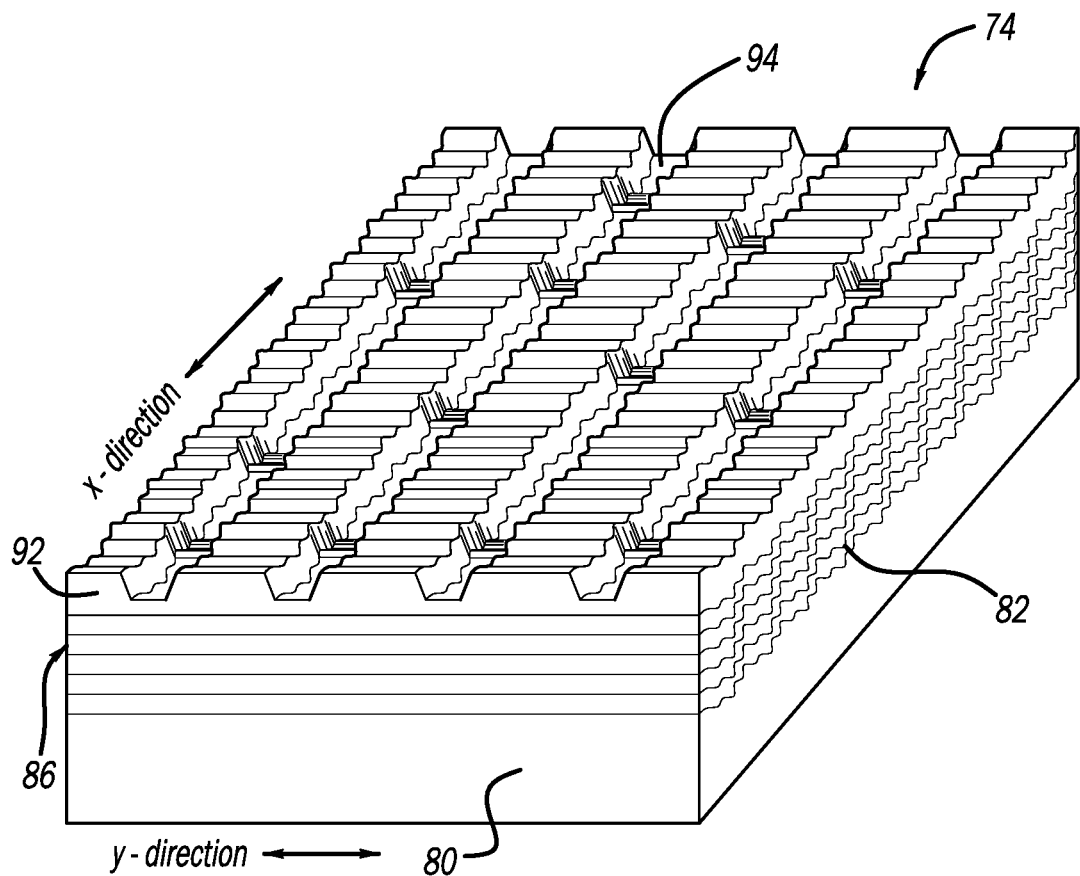
FIG. 3 is an isometric view of a known integrated DOE and SBC grating.

The '366 patent referred to above discloses an integrated DOE and SBC grating that is suitable to be used as the optical element 72. FIG. 3 is a recreation of FIG. 7 from the '366 patent, and shows an optical element 74 including a substrate 80, a multi-layer HR coating 86, and a top dielectric layer 92. A DOE periodic structure 82 is formed into the height h(x) of the substrate 80 in an x-direction, and the coating 86 and the layer 92 follow that pattern when they are deposited. This defines a smooth height function $h(x)=\lambda[\varphi(x)/4\pi]$, which is typically of a magnitude on the order of the wavelength $\lambda$, and is a periodic function of position along one axis of the optical surface with period d. For each of the N columns in the fiber array 28, the wavelength $\lambda$ determines the ratio $\lambda_i/d$, which gives the required angular separation of the M beams within that column. The top layer 92 is etched to form SBC grating channels 94 in a y-direction, such as by depositing and patterning a photoresist layer and exposing the photoresist layer using known holographic or lithographic techniques, so that the element 74 includes both DOE and SBC grating.

As will be discussed below, the present disclosure proposes an optical element having an integrated DOE and SBC grating that is also suitable to be used as the optical element 72 and that provides certain advantages over the element 74, such as a reduction in the number of fabrication steps and a more precise and efficient DOE.

Figure 4:
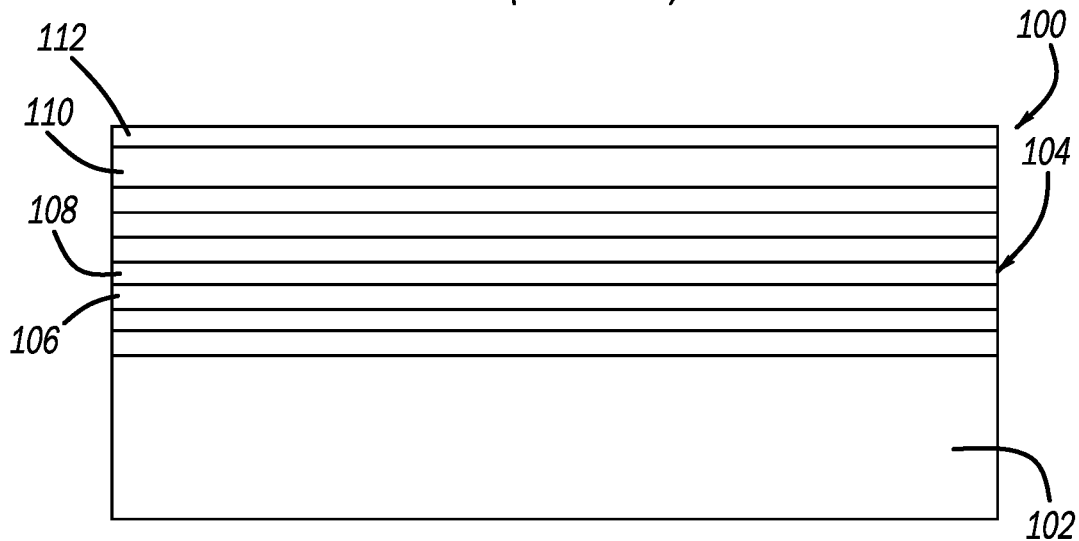
FIGS. 4-6 are a series of views showing fabrication steps of an integrated DOE and SBC grating suitable for the amplifier shown in FIG. 2.
Figure 5:
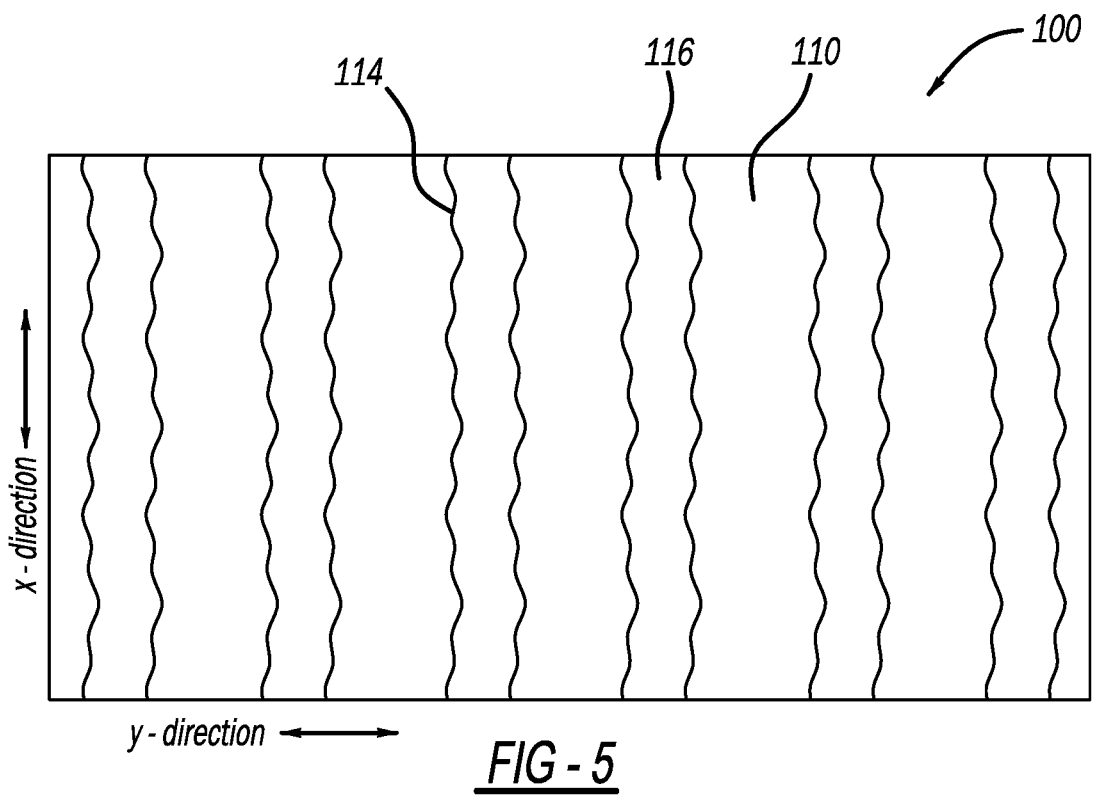
Figure 6:
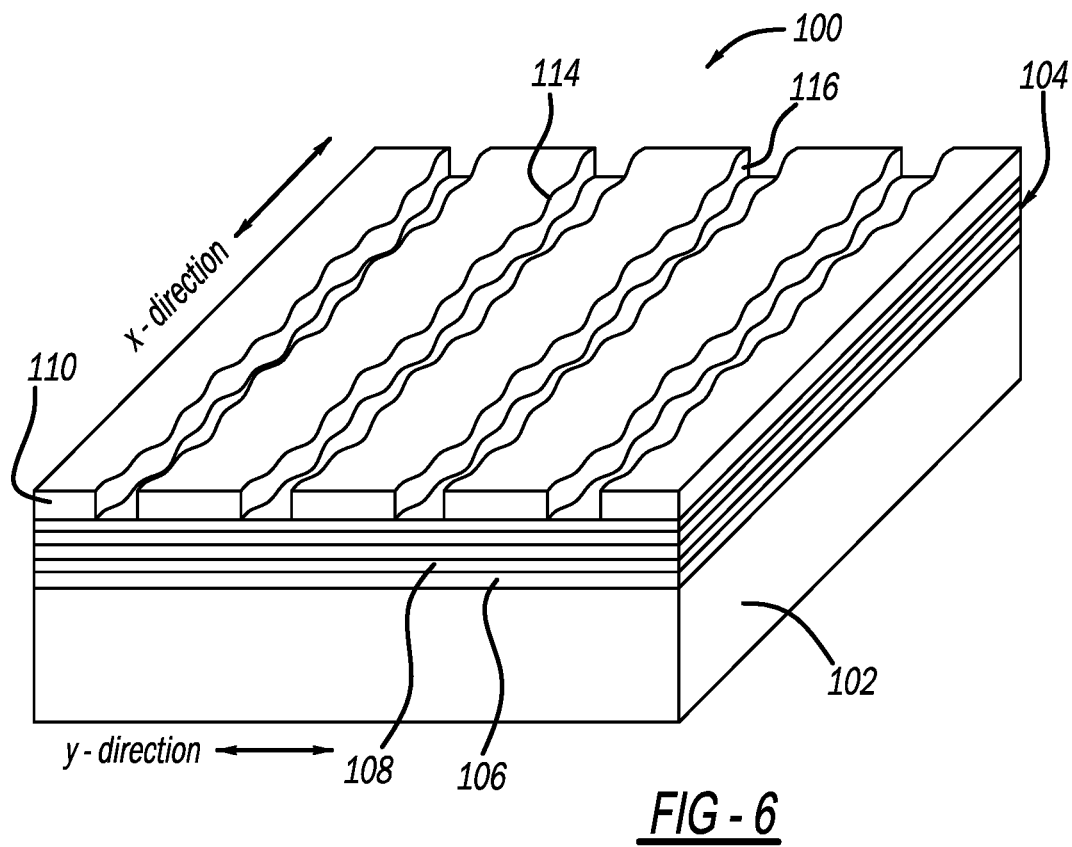

FIG. 4 is a profile view of a fabrication step for an integrated DOE and SBC grating optical element 100 that can be used for the optical element 72. FIG. 5 is a top view and FIG. 6 is an isometric view of the element 100 after a final fabrication step. The element 100 includes a substrate 102, such as glass or silicon, and being a few millimeters to centimeters thick, having an optical flat surface, and a multi-layer dielectric high-reflection (HR) coating 104 deposited on the substrate 102. The multi-layer coating 104 includes an alternating sequence of a high index of refraction dielectric layer 106 and a low index of refraction dielectric layer 108, many of which are known in the art. In this non-limiting embodiment, each of the layers 106 and 108 is about one-quarter of a wavelength $\lambda$ in optical thickness, and the total thickness of all of the layers 106 and 108 could be on the order of 5-10 μm. A top dielectric layer 110, such as silica or another suitable oxide, that is a few μm or less in thickness is deposited on the HR coating 104.

A photoresist coating 112 is deposited on the layer 110 and is patterned for an etching process that defines periodic structures for the DOE and an SBC grating. Thus, instead of forming the periodic pattern for the DOE in the substrate 102 and causing the coating 104 to conform to the pattern as was done in the '366 patent, both the periodic patterns for the DOE and the SBC grating are formed at the same time by one etching process. More specifically, the layer 110 is etched into its top surface to simultaneously produce a DOE periodic structure 114 having groove positions shifted in a y-direction by a distance that is described by a function $\Delta y(x)$ that is periodic in an x-direction and appropriately shaped channels or grooves 116 that are periodic in the y-direction that provide the periodic structure for the SBC grating. In this non-limiting embodiment, the grooves 116 have a rectangular cross-sectional shape for a particular application. However, as will be appreciated by those skilled in the art, other shapes for other applications may be equally applicable, such as trapezoidal, sawtooth, triangular, etc. Although the periodic structure 114 for the DOE is formed in the x-direction, it is noted that the periodic structure for the DOE in the '366 patent is formed into and out of the substrate, which leads to a height variation in the top layer 92, whereas in this disclosure, the periodic structure 114 for the DOE is formed by varying groove positions across a flat plane defining the layer 110.

The groove position function $\Delta y(x)$ for the periodic structure 114 is a smoothly varying function typically having a magnitude on the order of the wavelength of interest that is periodic along the x-direction and having a period d. For each of the N columns in the fiber array 28, the wavelength $\lambda_i$ determines the ratio $\lambda_i/d$, which gives the required angular separation of the M beams within that column. The period of the periodic structure 114 is typically about 100 times the wavelength $\lambda$ or larger of the beam of interest so that maximum angles of the groove edges with respect to the x-direction are typically small, such as on the order of tens of mrad. It is noted that the typical period of the periodic structure 114 for the DOE is about 100 μm to combine the coherent beams and the period of the grooves 116 for the SBC grating is typically about 0.5-1 μm to combine the beams of varying wavelength.

The same optical functions for a combined DOE and SBC grating discussed above can be provided for a transmissive optical element. For a transmissive optical element, the HR coating 104 would be eliminated, and either the substrate 102 is patterned and etched directly or a cap layer is applied and etched directly on the substrate 102, or on top of an anti-reflection (AR) multi-layer dielectric coating. It is also noted that if the integrated DOE and SBC grating device is a transmissive device, either of the coating 104 and the dielectric layer 110 may or may not need to be included, and if the integrated DOE and SBC grating device is a reflective device, both the coating 104 and the dielectric layer 110 would be required.

A holographic fabrication process can be employed where an interference pattern between impinging beams generates light and dark fringes that expose the photoresist coating 112 to generate the periodic patterns necessary to define the DOE and the SBC grating. To achieve both orthogonal periodic structures, the coating 112 is exposed not by straight interference fringes, but where the fringe positions, and thus the grooves 116, vary along the x-direction. If the basic grating period is p, then a shift of the grooves 116 from their normal periodic position along the y-direction by $\Delta y(x)$ results in a phase shift of the diffracted beam by $\varphi(x)=2\pi\Delta y(x)/p$. In the '366 patent, the varying phase shift along the x-direction was achieved by etching the substrate to vary the surface height h(x) along the x-direction so that the phase shift is $\varphi(x)=4\pi h(x)/\lambda$. Thus, the SBC grating writing process itself is leveraged to provide the necessary x-direction dependent phase variation $\varphi(x)$ via shifted grating groove locations $\Delta y(x)$ to achieve the DOE functionality.

Any suitable holographic patterning technique for achieving the required x-direction dependence of fringe and groove positions can be used, such as scanning beam interference lithography (SBIL). Through SBIL, a focused exposure beam is scanned across the photoresist coating 112 while varying the relative phase between two constituent beams that form fringes in the illuminated focal spot. A raster scan can be employed where the x-direction is scanned while varying the relative phase φ(x) between the beams, thus varying the fringe y-direction positions Δy(x) as a function of the position along the x-direction. The raster scan would then progress across the optical element 100 at successive y-direction positions reproducing the identical x-direction variation in the position of the exposure fringes and corresponding periodically placed grooves, and thereby providing the required diffractive phase variation φ(x). Since the phase function φ(x) is controlled electronically in SBIL, the groove position function Δy(x) can be very precise, more so than the height etching process needed in the '366 patent, and therefore the current described method can create a more accurate and efficient DOE functionality. As a result, a wide range of DOE phase designs can be incorporated into the fringe and grating groove positions, where the limiting resolution of the focused scanning beam in the x-direction can be one to several microns. Thus, the SBIL technique enables μm-scale variations in groove position along the x-direction. Typically, the grating period p is less than 2 μm, such as ~1 μm, whereas the scale of variation for the DOE along the x-direction is much slower, such as greater than 10 μm, such as ~100 μm. The resulting diffractive optic thus has a slowly varying groove position along the x-direction, which can be tailored to provide the DOE coherent beam combination function, as well as the conventional grating function along the y-direction to spectrally combine a number of beams. In an alternate embodiment, raster scanning along the y-direction can be employed to provide the periodic varied groove position pattern Δy(x) for the DOE, where the phases between the SBIL beams are adjusted between scans to shift the grooves.

Figure 7:
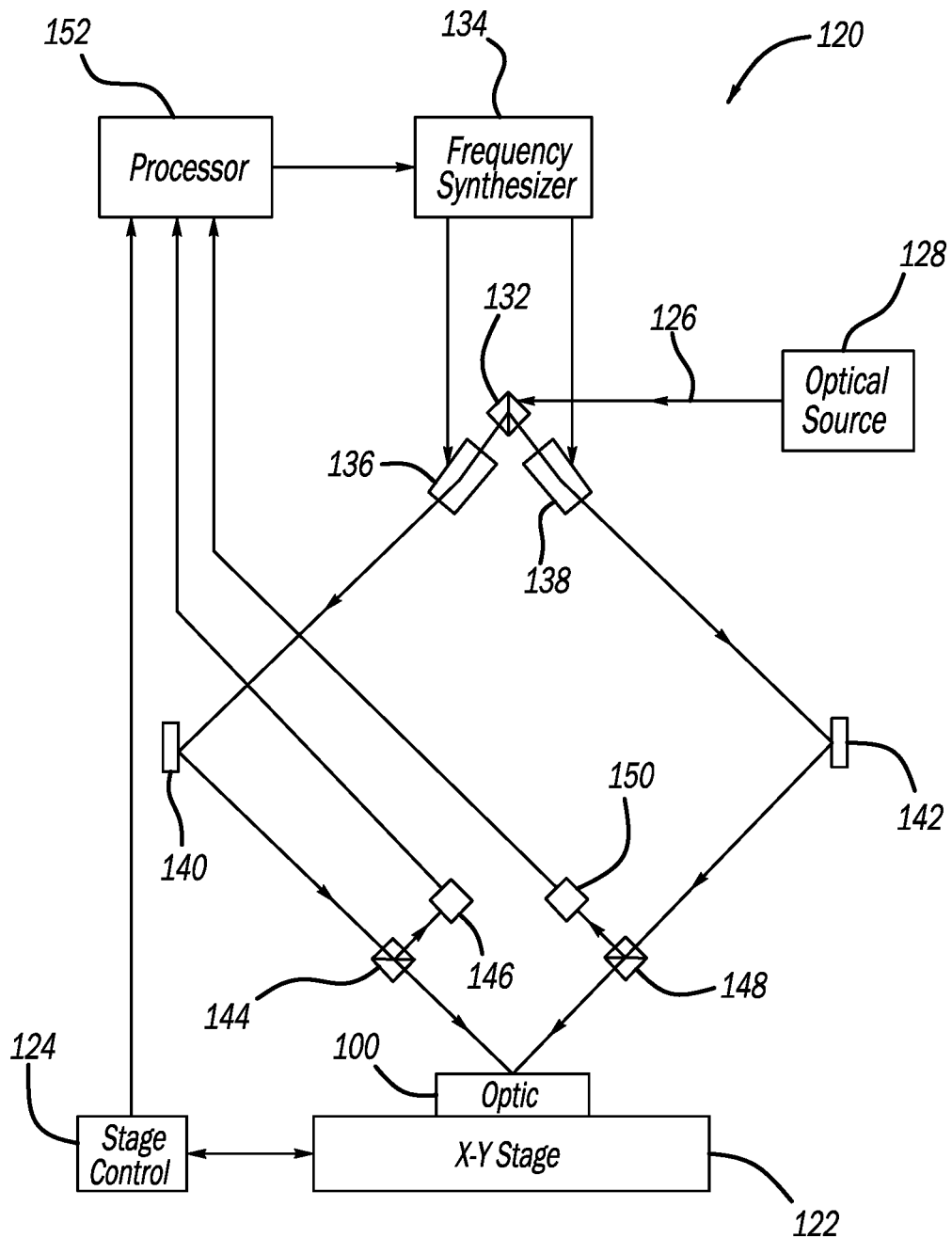
FIG. 7 is a block diagram of a scanning beam interference lithography (SBIL) system for fabricating the integrated DOE and SBC grating shown in FIG. 6.

FIG. 7 is a block diagram of a known SBIL system 120 that is suitable for simultaneously producing the DOE periodic structure 114 and the grooves 116 that provide the SBC grating in the manner referred to above. The system 120 includes an X-Y translational stage 122 on which is mounted the optical element 100 at the fabrication step shown in FIG. 4, and whose position is controlled by a stage controller 124. An optical beam 126 from an optical source 128 is split by a beam splitter 132, and one split beam is modulated by an acousto-optical modulator (AOM) 136 and the other split beam is modulated by an AOM 138. The modulation of the AOMs 136 and 138 are controlled by a frequency synthesizer 134 that provides an acoustical signal at a certain frequency to an optical element (not shown) in the AOMs 136 and 138 through which the beam propagates that creates an acoustic diffraction grating in the element that causes a frequency shift of the beam in a manner well understood to those skilled in the art. The acoustical frequency signal from the frequency synthesizer 134 is selected so as to provide a time varying relative phase difference between the split beams so that when the modulated split beams are directed by reflectors 140 and 142 onto the element 100 the relative phase differences created by the AOMs 136 and 138 generates an interference pattern that provides spatial variations in periodic fringe positions and defines the groove locations. A sample portion of the split beam from the AOM 136 is sampled by a beam splitter 144 and its phase is measured by a phase detector 146, and a sample portion of the split beam from the AOM 138 is sampled by a beam splitter 148 and its phase is measured by a phase detector 150. The measured phases from the detectors 146 and 150 are compared in a processor 152 that controls the frequency synthesizer 134 to provide the desired interference pattern. The stage controller 124 moves the stage 122 in a raster scanning process such as referred to above so that the interference spot on the element 100 moves in a pattern that creates the grooves 116 to have undulations for the DOE periodic structure 114.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. An optical device comprising:
   a substrate having a top planar surface;
   a planar reflective coating deposited on the top surface of the substrate;
   a top dielectric layer deposited on the reflective coating; and
   a periodic structure formed into the top dielectric layer in a first direction and a periodic grating having channels formed into the top dielectric layer in a second direction substantially orthogonal to the first direction, wherein the periodic structure includes periodic modulations along the length of the channels that are orthogonal to a channel-to-channel periodicity of the periodic grating.

2. The optical device according to claim 1 wherein the periodic structure is effective to be used as a diffractive optical element for combining coherent beams having different angular displacements and the periodic grating is effective to be used as a spectral beam combiner for combining incoherent beams having different wavelengths and angular displacements.

3. The optical device according to claim 2 wherein the optical device is part of a fiber amplifier system.

4. The optical device according to claim 1 wherein the periodic structure and the periodic grating are simultaneously formed by a single etching process.

5. The optical device according to claim 4 wherein the fabrication process employs a holographic patterning technique that exposes a photoresist coating deposited on the top dielectric layer by interfering beams.

6. The optical device according to claim 5 wherein the holographic patterning technique is scanning beam interference lithography.

7. The optical device according to claim 1 wherein the reflective coating includes a plurality of dielectric layers.

8. The optical device according to claim 7 wherein the plurality of dielectric layers are a plurality of dielectric layers deposited in an alternating sequence of a high index of refraction dielectric layer and a low index of refraction dielectric layer.

9. The optical device according to claim 1 wherein the period of the periodic structure is greater than 10 μm and the period of the periodic grating is less than 2 μm.

10. The optical device according to claim 1 wherein the top dielectric layer is silica or other oxide.

11. The optical device according to claim 1 wherein the substrate is glass or silicon.

12. An integrated optical device that includes a diffractive optical element for combining coherent beams having different angular displacements and a spectral beam combiner for combining incoherent beams having different wavelengths and angular displacements, said device comprising:
   a planar substrate having a planar top surface;
   a top dielectric layer deposited on the substrate; and
   a periodic structure formed into the top dielectric layer in a first direction that defines the diffractive optical element and a periodic grating having channels formed into the top dielectric layer in a second direction substantially orthogonal to the first direction that defines the spectral beam combiner, wherein the periodic structure includes periodic modulations along the length of the channels that are orthogonal to a channel-to-channel periodicity of the periodic grating.

13. The optical device according to claim 12 wherein the optical device is part of a fiber amplifier system.

14. The optical device according to claim 12 wherein the periodic structure and the periodic grating are simultaneously formed by a single etching process.

15. The optical device according to claim 14 wherein the fabrication process employs a holographic patterning technique that exposes a photoresist coating deposited on the dielectric layer by interfering beams.

16. The optical device according to claim 15 wherein the holographic patterning technique is scanning beam interference lithography.

17. The optical device according to claim 12 wherein the period of the periodic structure is greater than 10 µm and the period of the periodic grating is less than 2 µm.

18. An integrated optical device that includes a diffractive optical element for combining coherent beams having different angular displacements and a spectral beam combiner for combining incoherent beams having different wavelengths and angular displacements, said device comprising:
   a planar substrate having a surface and a thickness; and
   a periodic structure formed into the surface of the substrate in a first direction substantially orthogonal to the thickness of the substrate that defines the diffractive optical element and a periodic grating having channels formed into the surface of the substrate in a second direction substantially orthogonal to the first direction and the thickness of the substrate that defines the spectral beam combiner so that the surface of the substrate is flat, wherein the periodic structure includes periodic modulations along the length of the channels that are orthogonal to a channel-to-channel periodicity of the periodic grating.

19. The optical device according to claim 18 wherein the optical device is part of a fiber amplifier system.

20. The optical device according to claim 18 wherein the periodic structure and the periodic grating are simultaneously formed by a fabrication process that employs a holographic patterning technique that exposes a photoresist coating deposited on the substrate by interfering beams.

* * * * *